(12) United States Patent
CaraDonna et al.

(10) Patent No.: US 9,237,195 B2
(45) Date of Patent: Jan. 12, 2016

(54) VIRTUAL STORAGE APPLIANCE GATEWAY

(75) Inventors: Joseph P. CaraDonna, Ashland, MA (US); David Slik, Burnaby (CA); Darrell G. Suggs, Raleigh, NC (US)

(73) Assignee: NetApp, Inc., Sunnyvale, CA (US)

( * ) Notice: Subject to any disclaimer, the term of this patent is extended or adjusted under 35 U.S.C. 154(b) by 403 days.

(21) Appl. No.: 13/458,199

(22) Filed: Apr. 27, 2012

(65) Prior Publication Data

US 2013/0290470 A1 Oct. 31, 2013

(51) Int. Cl.
*G06F 15/173* (2006.01)
*G06F 13/00* (2006.01)
*H04L 29/08* (2006.01)
*G06F 17/30* (2006.01)

(52) U.S. Cl.
CPC ...... *H04L 67/1097* (2013.01); *G06F 17/30165* (2013.01); *G06F 17/30235* (2013.01); *G06F 17/30292* (2013.01); *G06F 17/30339* (2013.01)

(58) Field of Classification Search
CPC .................... H04L 67/1097; G06F 17/30165; G06F 17/30235; G06F 17/30292; G06F 17/30339
USPC .......................................... 709/224; 711/162
See application file for complete search history.

(56) References Cited

U.S. PATENT DOCUMENTS

| 7,546,486 | B2 * | 6/2009 | Slik et al. ........................ 714/15 |
| 7,613,890 | B1 * | 11/2009 | Meiri ............................ 711/162 |
| 7,904,482 | B2 * | 3/2011 | Lent et al. ..................... 707/802 |
| 8,051,113 | B1 * | 11/2011 | Shekar et al. ................. 707/821 |
| 8,078,622 | B2 * | 12/2011 | Rabii et al. .................... 707/737 |
| 8,230,187 | B1 * | 7/2012 | Krinke et al. ................. 711/162 |
| 2002/0129203 | A1 * | 9/2002 | Gagne et al. .................. 711/114 |
| 2004/0243699 | A1 * | 12/2004 | Koclanes et al. ............. 709/224 |
| 2006/0026219 | A1 * | 2/2006 | Orenstein et al. ............. 707/204 |
| 2007/0100792 | A1 * | 5/2007 | Lent et al. ......................... 707/1 |
| 2007/0294310 | A1 * | 12/2007 | Yagawa ........................ 707/200 |
| 2010/0114889 | A1 * | 5/2010 | Rabii et al. .................... 707/737 |

OTHER PUBLICATIONS

Demmer, Michael et al., "TierStore: A Distributed Storage System for Developing Regions," http://tier.cs.berkeley.edu/docs/projects/tierstore.pdf, 11 pages.

* cited by examiner

*Primary Examiner* — Viet Vu
*Assistant Examiner* — Michael A Chambers
(74) *Attorney, Agent, or Firm* — Gilliam IP PLLC

(57) ABSTRACT

Methods and apparatuses for operating a storage system are provided. In one example, a storage system includes a storage server and a virtual storage appliance (VSA) implemented in a virtual machine. The storage server provides access to a first shared namespace of data. The VSA is operatively connected to the storage server system over a network connection and provides access to a second shared namespace of data over the network connection. The second shared namespace is defined by a policy and includes a subset of the first shared namespace. The VSA also replicates data of a third shared namespace of data at the VSA making the third shared namespace available at the VSA when the network connection is unavailable. The third namespace is defined by the policy and includes a subset of the second shared namespace.

28 Claims, 6 Drawing Sheets

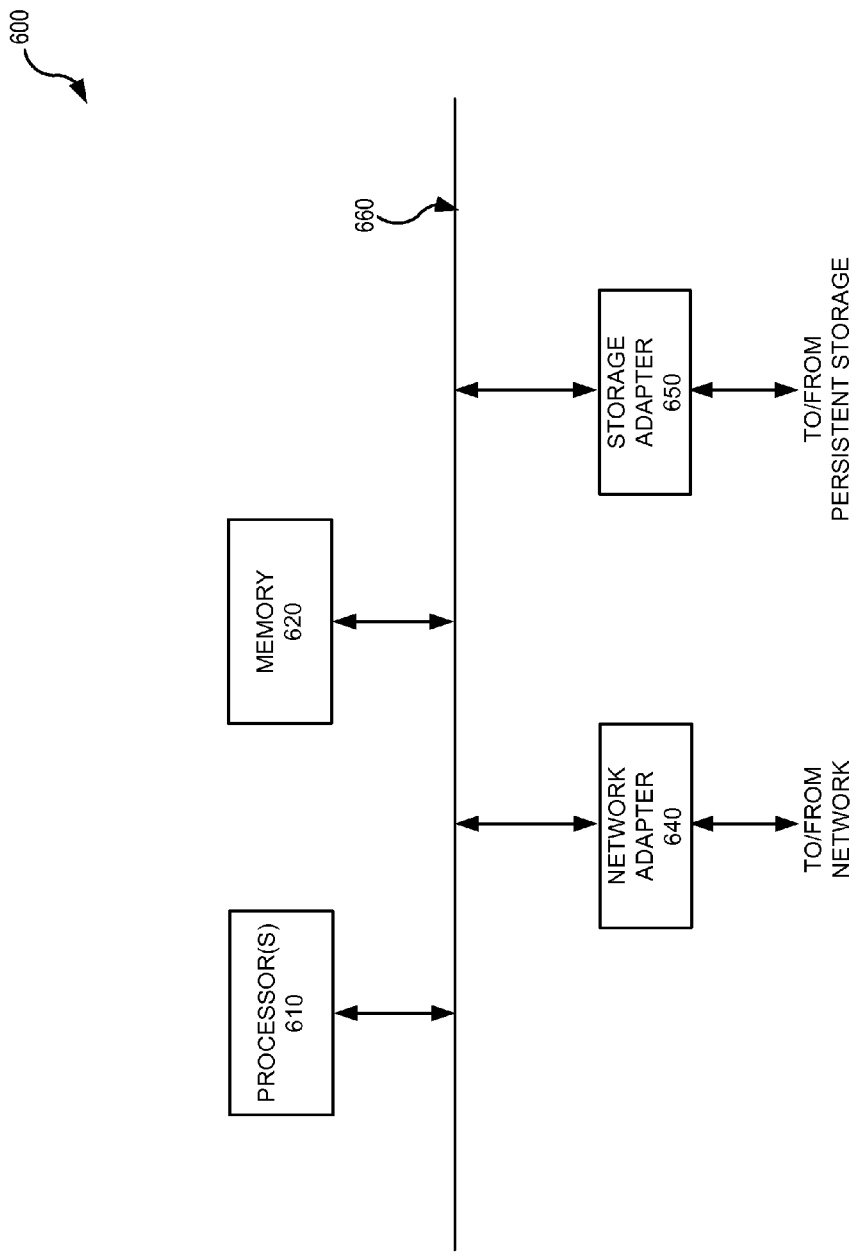

VIRTUAL STORAGE APPLIANCE GATEWAY

TECHNICAL FIELD

Various embodiments of the present application generally relate to the field of managing data storage systems. More specifically, various embodiments of the present application relate to methods and systems for using a virtual storage appliance to provide access to a shared data system from a remote location.

BACKGROUND

Modern data centers often include storage systems, storage controllers, mass storage devices, and other devices for managing, storing, and providing access to data. These data centers often provide data services to geographically distributed users. The users often have widely varying storage and access requirements. Many users work at core sites or in facilities with significant computing and network resources. At the same time, other users at edge or remote locations may have limited access to computing resources and/or network connections. Remote and edge locations may have unreliable, slow, or intermittent network connections. In some cases, network access may only be available through relatively expensive wireless means and/or may need to be used sparingly for budgetary reasons. Network connectivity may also be intermittent for the increasing number of employees who work from home offices and mobile locations.

In some cases, dedicated storage equipment is implemented at edge locations in order to minimize the negative impacts of network outages and latencies. However, implementing dedicated storage devices at remote or edge locations may not be feasible due to equipment costs, support costs, lack of sufficient or reliable power, the number of locations, security issues, and/or availability of physical space. These issues often present even bigger challenges for mobile employees. Transporting and setting up the additional dedicated storage equipment at each work location would be unfeasible in many cases.

For example, a radiologist may work from home or another remote location. The radiologist may also provide services to several geographically distributed medical facilities. The radiologist and the medical facilities need shared and reliable access to medical images and other related data. However, this access must also be carefully controlled for reasons of privacy and regulatory compliance. In many cases, every request for a medical image or other data requires sending a request for the data to the core storage location and receiving the data over a network connection. A slow or interrupted network connection can have significant impacts on the radiologist's productivity, the effectiveness of other related medical service providers, and/or the timeliness of care.

In remote sensing applications, computing devices are often installed at remote locations to gather data. Network connectivity at these locations may be minimal and the environment may not be suitable for installation of supplemental storage and processing equipment. Implementing dedicated storage hardware at these remote locations may not be feasible for cost, environmental, or other reasons.

In some cases, a dedicated storage device, such as a cloud gateway, is installed at the remote location in order to facilitate data access. However, these devices only provide access to a dedicated namespace of data at the core storage location and do so at the cost of additional hardware. A namespace is a logical grouping of identifiers for files or data stored in a data storage system. In many cases, a namespace may be shared across multiple systems or users. Datasets in dedicated namespaces are not easily available for access and/or modification by multiple users. Shared namespaces are typically stored in centralized locations in order to provide data access for multiple users. Some solutions cache currently or recently accessed files at the remote location making them available regardless of network connectivity. However, currently or recently accessed files are typically only a small subset of an entire shared namespace of data. A user may need to access larger or alternate subsets of the data during periods when a network connection is unavailable or has insufficient bandwidth to provide effective real time access. In addition, dedicated hardware devices like cloud gateways often impose other limitations including additional power, space, mounting, thermal, air filtration, and/or security requirements. In addition, these dedicated hardware devices cannot be easily or quickly scaled to meet changing needs.

In addition to the connectivity issues described above, centralized data access may be challenging due to the evolving nature of computing and storage systems. While an organization may ideally prefer to have all of their data managed within a single framework and/or file system, the evolution of technology often means that data may be spread across multiple systems. It is desirable to provide simplified access to these users while still maintaining proper access control. All of these issues present challenges to providing users, particularly users at edge or remote locations, simplified and reliable access to shared data across multiple systems. These challenges are likely to continue due to the combination of increasingly distributed workforces, data-centric work content, a continuing move towards centralized data management, and constantly evolving data systems.

SUMMARY

In distributed storage systems, users in remote locations may have difficulty accessing shared namespaces when a network connection to a centralized storage location is not available or when network use is limited for some other reason. Dedicated storage system hardware may be installed at the remote locations and synchronized with the centralized storage location to provide local access to the shared namespace. However, installing dedicated storage system hardware at remote locations is often undesirable due to cost, power requirements, space requirements, support needs, or for other reasons. Accordingly, introduced herein a virtual storage appliance (VSA) that can be implemented in existing fixed and mobile computing hardware, and that is capable of providing local access to a shared namespace, or preferred subset(s) of a shared namespace, at a remote location when a network connection is not available, without requiring additional computing hardware to be installed or maintained at the remote location.

In one example, a storage system includes a storage server and a VSA implemented in a virtual machine. The storage server provides access to a first shared namespace of data. The VSA is operatively connected to the storage server system over a network connection and provides access to a second shared namespace of data over the network connection. The second shared namespace is defined by a policy and includes a subset of the first shared namespace. The VSA also replicates data of a third shared namespace of data at the VSA making the third shared namespace available at the VSA when the network connection is unavailable. The third namespace is defined by the policy and includes a subset of the second shared namespace. This storage system enables a remote user to access the entire second shared namespace even if it spans multiple file systems and also allows the remote user to continue using data in the third shared namespace even when a network connection is not available.

The VSA described above may be implemented in a computing device which also serves other purposes, thereby improving data access without creating a need for additional or dedicated storage hardware. The VSA may be implemented in a virtual machine on an existing server or computing device at the remote location. In some cases, the computing device may be an end user's personal computer or mobile computing device. In some cases, various elements of the storage system may be managed as a federated group.

The VSA provides access to a shared namespace on the storage server through a network connection, when the network connection is available. The shared namespace may be accessed by multiple users or systems. In addition, the VSA stores another portion of the shared namespace in order to make the associated data namespaces available at the VSA when the network connection is not available. The data which makes up the locally stored namespace can be accessed and/or modified even when a network connection is not available. The VSA is operated as an element of the storage system such that data is synchronized between the VSA and the other elements of the storage system, based on policy, when the network connection is available.

In one embodiment, the method described above also includes permitting modification of a dataset in the replicated third shared namespace at the VSA, even when a network connection is not available. Modifications to the dataset are synchronized with other elements of the storage system when the network connection becomes available. In addition, the policy may permit creation of a new dataset at the VSA. The new dataset is part of the replicated namespace and eventually gets synchronized with the storage system over the network connection.

In one embodiment, one or more additional VSAs may also be implemented in the system. The number of VSAs may be dynamically scaled to meet changing needs of the system. Additional VSAs may be implemented on the same physical machine or in another physical machine in a different location. In addition to accessing and synchronizing data with the core storage system, the VSAs may also access data from and synchronize data among each other.

Embodiments of the present invention also include other methods, systems with various components, and non-transitory machine-readable storage media storing instructions which, when executed by one or more processors, direct the one or more processors to perform the methods, variations of the methods, or other operations described herein. While multiple embodiments are disclosed, still other embodiments will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present invention will be described and explained through the use of the accompanying drawings in which:

FIG. 6 is a block diagram of a system that can be used to implement components of a storage system.

Figure 1:
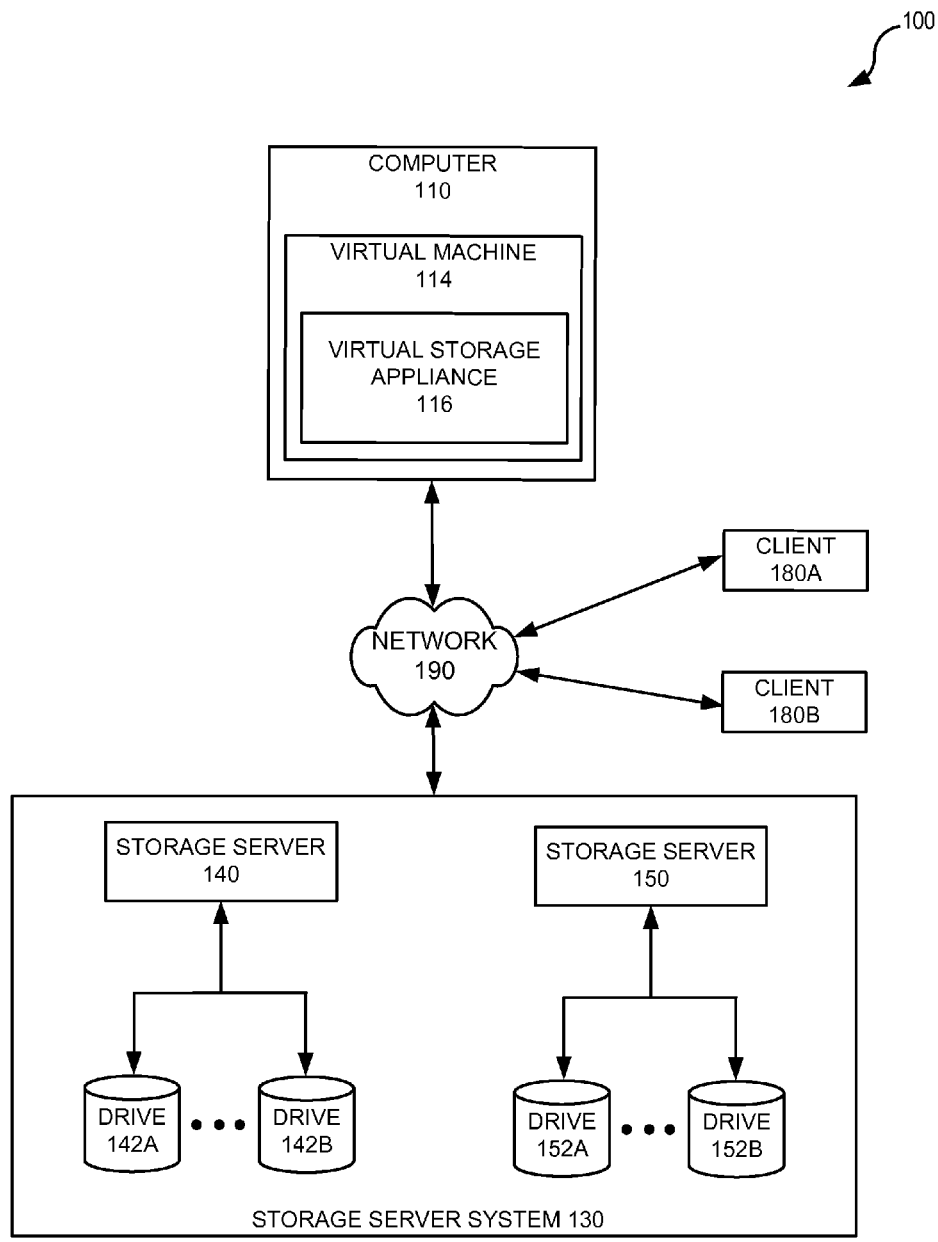
FIG. 1 illustrates an operating environment in which some embodiments of the present invention may be utilized.

The drawings have not necessarily been drawn to scale. For example, the dimensions of some of the elements in the figures may be expanded or reduced to help improve the understanding of the embodiments of the present invention. Similarly, some components and/or operations may be separated into different blocks or combined into a single block for the purposes of discussion of some of the embodiments of the present invention. Moreover, while the invention is amenable to various modifications and alternative forms, specific embodiments are shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Various embodiments of the present application generally relate to the field managing data storage systems. More specifically, various embodiments of the present application relate to methods and systems for using a virtual storage appliance to provide access to a shared data system from a remote location.

In computing environments, reliance on centralized or core data storage facilities continues to increase. Centralized data facilities are able to provide more reliable data management services as well as provide shared access to data for many users, including geographically dispersed users. Data users typically rely on network connections in order to access data from these central locations. Some users may have an intermittent and/or unreliable network connection to the centrally stored data. If data is not stored locally at the remote location, each data access is back-hauled over the network between the remote location and the core data store. Slow, unreliable, or unavailable network access can significantly hinder work activities at the remote location.

The present invention resolves these and other problems by implementing a VSA in a virtual machine at remote locations. The virtual machine may be implemented in existing, non-dedicated, computing hardware and provides access to a policy specified, shared namespace over a network connection. In addition, the VSA replicates the data of a specified portion of the shared namespace for use when the network connection is unavailable, or has insufficient bandwidth, to meet data access needs. The VSA may be operated as an element of a federated group of devices which make up the storage system such that modifications of or additions to a dataset of namespace replicated at the VSA is synchronized with the storage system when the network connection is available. Additional VSAs may be implemented in the same physical machine, or in other physical machines, in order to meet changing needs at one or more remote locations.

Having described embodiments of the present invention generally, attention is now directed to FIG. 1, which illustrates an operating environment in which some embodiments of the present invention may be utilized. Operating environment 100 includes computer 110, storage server system 130, clients 180A and 180B, and network 190.

Storage server system 130 includes storage server 140, storage server 150, and drives 142A, 142B, 152A, and 152B. Storage server system 130 may also include other devices or storage components of different types which are used to manage, contain, or provide access to data or data storage resources. Storage servers 140 and 150 are computing devices that each include a storage operating system that implements one or more file systems. A "file system," as the term is used herein, is a structured set of logical containers of data, which may be, but are not necessarily, in the form of files, directories, volumes, LUNs, objects and/or other type(s) of logical containers. Storage server 140 and 150 may each be, for example, a server-class computer that provides storage services relating to the organization of information on writable, persistent storage media such as drives 142A, 142B, 152A, and 152B. Drives 142A, 142B, 152A, and 152B include persistent storage media for storing data and may each be a hard disk drive (HDD), flash memory, a solid-state drive (SSD), a tape drive, or other form of persistent storage facility, or a combination thereof. Storage server 140 or storage server 150 may also utilize other types of persistent storage devices including flash memory, non-volatile random access memory (NVRAM), micro-electrical mechanical (MEMs) storage devices, or a combination thereof. Storage server 140 or storage server 150 may also make use of other devices, including a storage controller, for accessing and managing the persistent storage devices.

Some or all of the persistent storage devices associated with storage server 140 or storage server 150 may be organized as a single logical storage unit. For example, drive 142A and drive 142B of storage server 140 may be organized as a redundant array of independent disks (RAID) which are operated as a single logical storage unit. Other drive configurations are possible. Storage server system 130 is illustrated as a monolithic system, but could include systems or devices which are distributed among various geographic locations. Storage server system 130 may also include additional storage servers which operate using storage operating systems which are the same or different from storage server 140 and storage server 150.

The data stored on drives 142A, 142B, 152A, and 152 includes a first shared namespace of data. The first shared namespace may be a global namespace for the entire enterprise or for storage server system 130. A global namespace is a heterogeneous, abstraction of file information included in storage server system 130. A global namespace enables the aggregation of disparate and/or remote network based file systems. It provides a consolidated view of these file systems that can reduce complexities of managing and accessing individualized systems. For example, storage server 140 and storage server 150 could each utilize their own individual namespaces that are managed using different file systems. By establishing a global namespace, namespaces of both storage server 140 and storage server 150 can be seamlessly accessed as a single, virtualized file system namespace.

While FIG. 1 illustrates storage server 140 and storage server 150 as non-distributed devices, those skilled in the art will appreciate that either could be implemented as a distributed device or a virtual device. Moreover, the functions of storage servers 140 and 150 may be adapted to a variety of storage server architectures and techniques, including a network attached storage (NAS) system, a storage attached network (SAN), or a direct-attached storage (DAS) system. The term "storage server" is broadly used to include such arrangements including a storage server that provides file-based access to data, block-based access to data, object-based access to data, another type of access, or a combination thereof.

Storage servers 140 and 150 interface with other devices directly or through network 190 as illustrated in FIG. 1. Network 190 includes one or more devices for exchanging information. For example, network 190 may include a local area network (LAN), a wide-area network (WAN), a metropolitan area network (MAN), a telecommunications network, the Internet, or any combination thereof. Network 190 may each also include routers, hubs, computers, servers, or other types of computing devices. Network 190 may be a wired network, a wireless network, or a combination thereof.

Clients 180A and 180B are applications or systems which communicate with storage server 140 or storage server 150 through network 190 to access data stored on the persistent storage media.

Computer 110 is a processing device and may include a server, a personal computer, a tablet computer, application-specific hardware, a mobile computing device, or a smartphone. Computer 110 includes virtual machine 114. A virtual machine is a computing environment in which an operating system (OS) or application can be installed and run within the host system hardware and OS. Virtual machine 114 emulates a physical computing environment, but requests for CPU, memory, hard disk, network connectivity, or other resources are managed by a virtualization layer which translates these requests to the physical resources of computer 110. Virtual machine 114 may be created within a virtualization layer, such as a hypervisor or a virtualization platform that runs on top of the OS of host computer 110. The virtualization layer can be used to create additional, isolated virtual machine environments within computer 110.

Virtual machine 114 includes virtual storage appliance (VSA) 116. VSA 116 is an application running on virtual machine 114 that allows an external system, such as storage server system 130, to utilize the storage resources of computer 110. In one example, VSA 116 allows a portion of the HDD space available in computer 110 to be used as an extension of storage server system 130. From an operating system perspective, virtual machine 114 isolates the operations of VSA 116 from other processing activities on computer 110 and allows VSA 116 to be implemented in an OS which is different than the OS of host computer 110. Because VSA 116 operates within virtual machine 114, VSA 116 is easily transportable and may be implemented on many different types of devices. VSA 116 may also be referred to as a virtual storage network appliance or a virtual storage optimization appliance.

Figure 2:
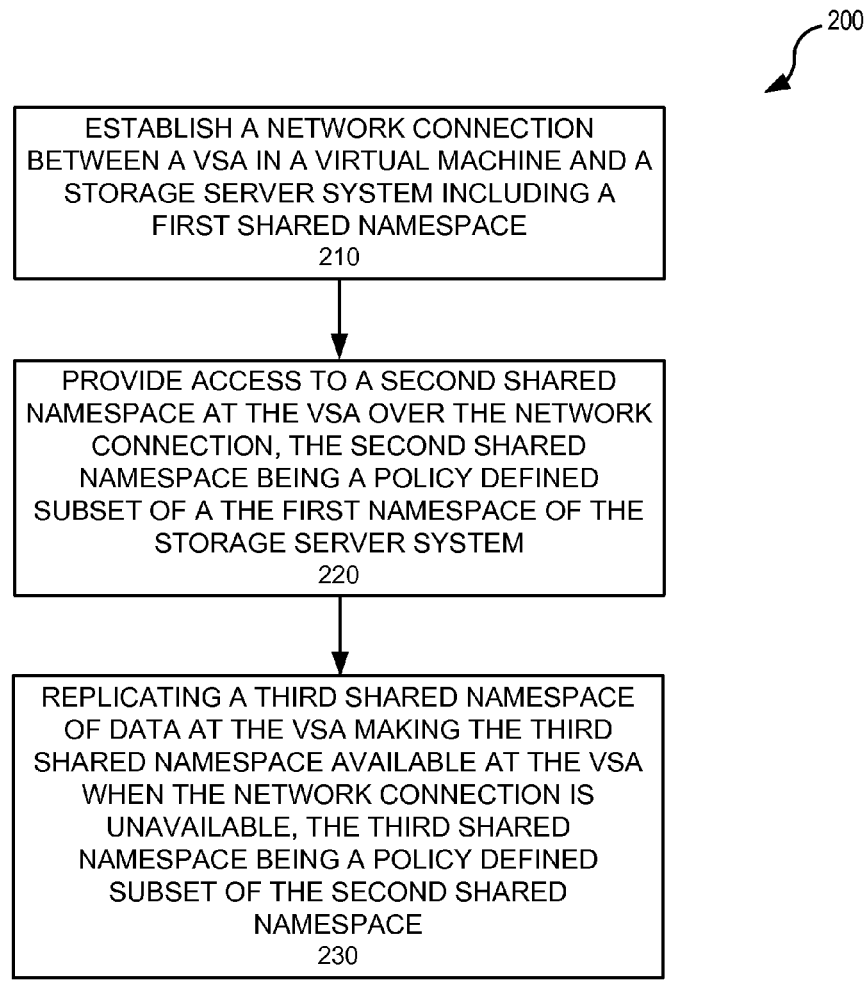
FIG. 2 illustrates an example of a method of operating a storage system.

FIG. 2 illustrates method 200 of operating a storage system. Method 200 is described below with respect to implementation in operating environment 100. However, implementation of method 200 in other operating environments is possible and the description below with respect to the elements of operating environment 100 is not intended to be limiting.

In one implementation of method 200, a network connection is established between VSA 116 in virtual machine 114 and storage server system 130 through network 190 (step 210). The network connection may also be established between VSA 116 and one or more of the individual storage servers which are included in storage server system 130. Storage server system 130 includes a first shared namespace of data which may be shared with other users or systems including clients 180A and 180B. The method includes providing access to a second shared namespace of data through the VSA over the network connection (step 220). The second shared namespace is a policy defined subset of the first shared namespace. As used herein, a "subset" of a namespace may be a portion of the namespace or the entire first shared namespace. The first shared namespace may include some or all of the individual namespaces of each of storage server 140 and storage server 150. The policy determines which subset or subsets of the first shared namespace are included in the second shared namespace accessible at VSA 116. The policy will most commonly be stored in storage server system 130, but may be stored in VSA 116 in some cases. The policy may also prevent access to portions of the first namespace which are not included in the second shared namespace. A system administrator or other party may control which portions of the first namespace are accessible by VSA 116 by appropriately creating and/or modifying the policy. Because virtual machine 114 may be implemented in an end user's computing device, the policy can provide access control down to the individual user level.

Continuing with FIG. 2, the method also includes replicating data of a third shared namespace at VSA 116 to make the data of the third shared namespace available at VSA 116 when network 190 is unavailable or when a network connection cannot be established for some other reason (step 230). The third shared namespace is also defined by the policy and is a subset of the second shared namespace. In this way, a user of computer 110 can continue accessing any datasets within the third shared namespace when a network connection is either not available or does not provide sufficient bandwidth to support the data access needs. Accessing a dataset in the third namespace at VSA 116, rather than through a network connection, may also have other benefits even if a network connection is available. For example, network bandwidth may be more expensive during peak usage times and caching shared namespace data for local access during these peak periods may be more cost effective.

Figure 3:
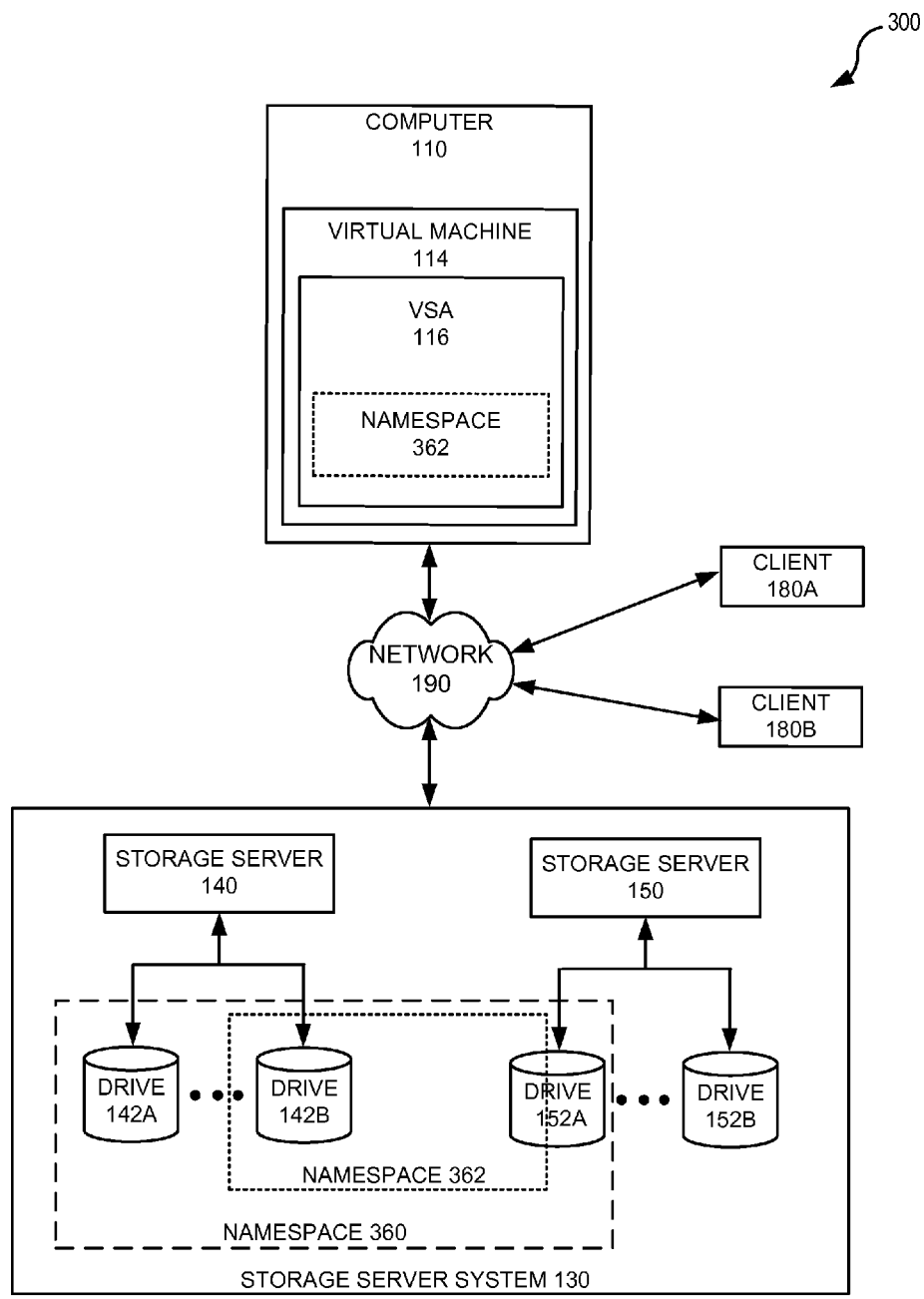
FIG. 3 illustrates an example of a storage system including a single VSA.

FIG. 3 illustrates operation of storage system 300. Storage system 300 is one example of the operating environment illustrated in FIG. 1. Storage server system 130 includes data stored on drives 142A, 142B, 152A, and 152B. Storage server 140 and storage server 150 are both elements of storage server system 130 and may utilize different file systems to manage their respective datasets. Storage server system 130 may also include additional storage servers, additional persistent storage devices, or other devices.

Many different logical namespaces can be defined which contain various subsets of the data contained in storage server system 130. For purposes of explanation, namespace 360 represents data on drives 142A, 142B, and 152A. However, a namespace will typically not categorically include or exclude entire disks (or other storage devices) because datasets are typically spread across multiple drives. For instance, in typical RAID implementations, even the smallest block of data is spread across multiple drives. However, the illustration of FIG. 3 in which namespace 360 includes specific drives is intended to illustrate that namespace 360 includes a subset of the data managed by storage server 140 and storage server 150. In some cases, namespace 360 could also include data associated with other storage servers and/or other storage server systems, including systems in other geographic locations.

Namespace 360 is a shared namespace; that is, data in namespace 360 may be accessed, and modified in some cases, by multiple users or systems. A policy defines which users, computers, and/or systems are permitted to access namespace 360. Individual policies may be created for each user, each computer, each virtual machine, and/or each VSA. Alternately, the elements of these individual policies may be defined in a single policy. A request for access to data in shared namespace 360 from an application running on computer 110 is processed by VSA 116 and routed over network 190 to storage server system 130. Access to data from shared namespace 360 is permitted or denied according to the policy. In some cases, the policy may define further permission details. For example, read privileges may be granted for a particular dataset, while write privileges are not. These policies may vary depending on the current state of the requested dataset and the whether or not that dataset is presently being accessed by other users or systems.

In addition to defining the subset of data in storage server system 130 that is accessible by VSA 116, the policy also defines a subset of the accessible namespace which will be replicated at VSA 116. In this example, namespace 362 defines the subset of data which is desired to be available at VSA 116 when a network connection is not available. In some cases, namespace 362 may include all of, and be logically equivalent to, namespace 360. The data which makes up namespace 362 is replicated to VSA 116 when the network connection is available. In this way, any dataset included in namespace 362 will be locally available at computer 110 when a network connection is unavailable.

In addition, datasets in namespace 362 may be accessed from the local copy in VSA 116 even when a network connection is available in order to improve access speed, minimize network congestion, reduce costs, or for other reasons. Even though the data of namespace 362 has been replicated to VSA 116, namespace 362 is a shared namespace the data of which may still be accessed from storage server system 130 by other clients, users, or systems. For example, a user of computer 110 may access a dataset in replicated namespace 362 of VSA 116 during a same time period in which client 180A is accessing the same dataset from storage server system 130. When a network connection is available, storage server system 130 manages the synchronization of replicated namespace 362 in VSA 116 to include any changes which have occurred in namespace 360. Synchronization details may be further defined by the policy.

Existing tools are known in the art for intelligently managing and synchronizing datasets across geographically distributed repositories. A policy engine manages how data is stored, placed, merged, synchronized, replaced, and/or protected. This policy engine also performs revision control functions and establishes rules which may allow a dataset of replicated namespace 362 at VSA 116 to be modified even though another user or system is accessing or modifying a dataset of namespace 362 from storage server system 130. Various methods of revision control and various revision control systems are known in the art. The policies described herein which describe which subsets of a namespace will be accessible and replicated at VSA 116 may be implemented in an existing revision control system or policy engine or may be implemented independently.

Storage server system 130 and/or storage servers 140 and 150 may be configured to automatically synchronize any changes made to the datasets of replicated namespace 362 at VSA 116 with the one or more instances of these datasets on drives 142A, 142B, 152A, and 152B. Synchronization may occur automatically as soon as a network connection is available or may be scheduled to occur at a predetermined time. The synchronization process may also be triggered or controlled by or through VSA 116.

In addition to permitting modification of the one or more datasets of namespace 362 which are replicated to VSA 116, the policy may also allow a new dataset to be created within namespace 362. VSA 116 may allow this new dataset to be created within the replicated instance of namespace 362 even though no network connection is available between VSA 116 and storage server system 130 at the time. When a network connection is available, the added dataset is updated to or merged with namespace 362 at storage server system 130 in accordance with rules set forth in the policy.

In some cases, storage server system 130 may be operated as a federated storage system. A federated storage system is a collection of autonomous storage resources or nodes governed by a common management system that provides rules about how data is stored, managed, and migrated throughout the storage network. The storage resources may include storage capacity managed by a variety controllers or appliances using a variety of file systems. In some cases, VSA 116 is managed as a logical extension of the federated storage system. In this case, VSA 116 is operated as a federated node in a manner similar to that used for managing datasets across storage servers 140 and 150.

Use of VSA 116 in the manner described above minimizes the negative impact of slow and intermittent network connections as well as provides access to a shared namespace when a network connection is not available. Processing associated with one or more datasets in shared namespace 362 may continue at or through computer 110 during these periods. At the same time, other users, such as client 180A or 180B, may continue utilizing the datasets from namespace 362 of storage system 130. This capability may be particularly useful for mobile employees. This capability may also be beneficial when computer 110 will be used in remote locations where network access is not available. Because VSA 116 is implemented in virtual machine 114 in computer 110, no additional hardware is needed for implementation. In some cases, virtual machine 114 and VSA 116 may be implemented in a laptop computer or other mobile computing device which a mobile employee is already carrying from location to location.

Namespace 360 and namespace 362 may be defined to include any data contained in storage server system 130, up to and including all of the data in storage server system 130. However, as a practical matter, there will typically be other limitations which require namespace 360 and namespace 362 to be smaller subsets of all the available data. These limitations may include storage capacity on computer 110, network bandwidth, data management overhead limitations, and user access permissions. Namespace 360 may be defined as the entire subset of the data at storage server system 130 to which a user of computer 110 has been granted access. While the user may access the entire namespace through VSA 116 when a network connection is available, the entire namespace may be too large to replicate to VSA 116. Therefore, a smaller subset of data which is more critical or currently has a higher priority for access may be defined for replication to make best use of the available storage space, as well as other resources, on computer 110.

In one example, namespace 360 may include datasets associated with all of the projects a user of computer 110 has worked on, while namespace 362 includes only datasets associated with projects the user is currently working on. Since the most of the user's time is expected to be spent working on the current projects, defining namespace 362 to include the currently active projects will improve the likelihood of having needed datasets available when a network connection is not available while preserving the storage resources of computer 110. Over time, the policy which defines namespaces 360 and 362 may change to meet the changing needs of the user, the availability of computing resources, and/or the availability of the network connection. In one example, the policy may be changed to define namespace 362 as a different subset of namespace 360 as a user's work assignment changes.

Figure 4:
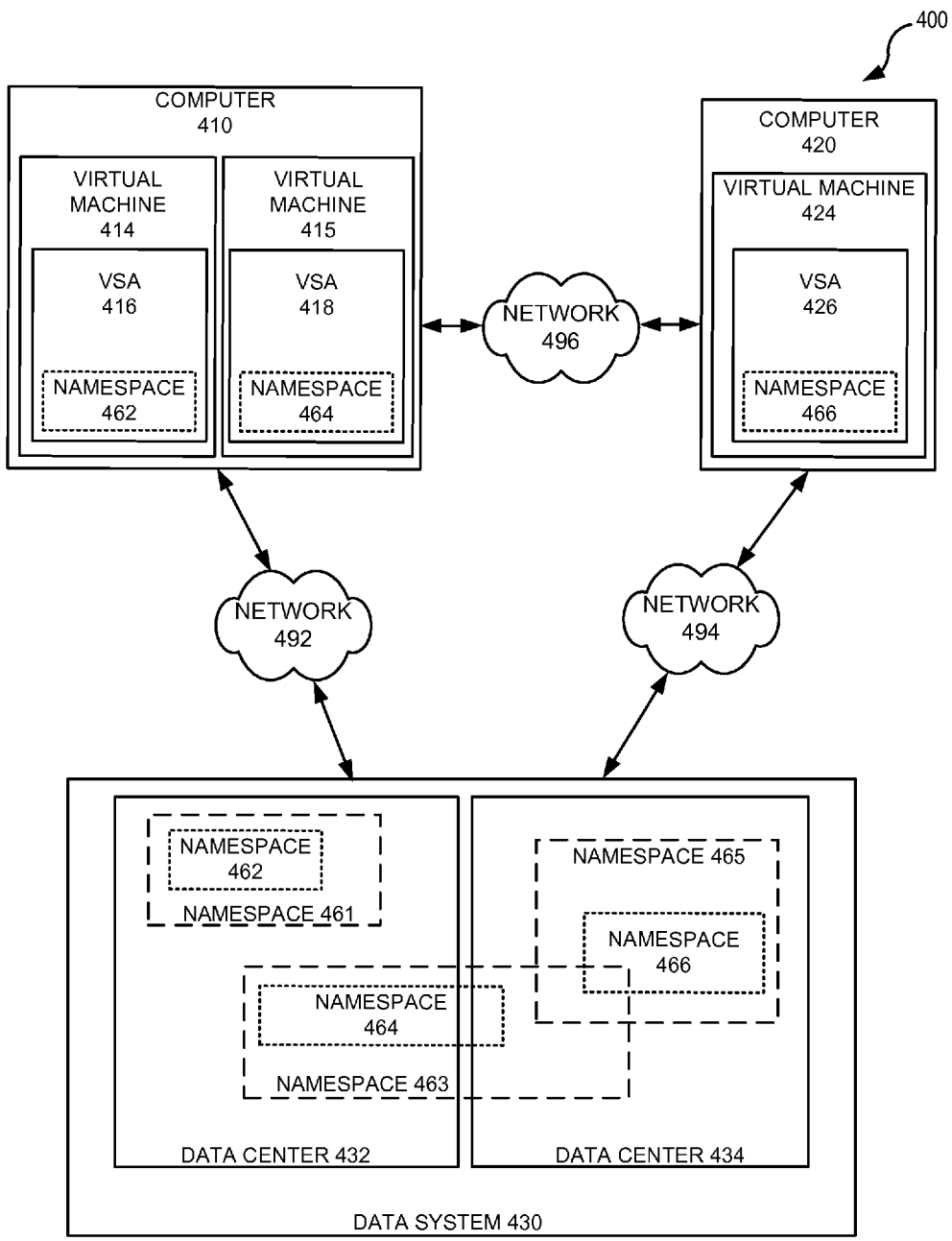
FIG. 4 illustrates an example of a storage system including multiple VSAs.

FIG. 4 illustrates storage system 400 in which one or more embodiments of the invention may be utilized. Storage system 400 includes computer 410, computer 420, data system 430, and networks 492, 494, and 496. Networks 492, 494, and 496 are examples of network 190.

Data system 430 is a logical representation of the data operations for an entire company or organization. Data system 430 includes data center 432 and data center 434. Data centers 432 and 434 include facilities used to house computer systems and related components, such as storage systems. Data centers 432 and 434 may also include power supplies, communication equipment, and environmental controls. Data system 430 will typically include other devices such as interface equipment. However, only data centers 432 and 434 are illustrated for purposes of explanation. Data center 432 and data center 434 may be in two different geographical locations and operatively connected by one or more networks. Data centers 432 and 434 may be operated in a coordinated or federated manner such that one or more logical namespaces of data can be defined to span the two data centers. For example, namespace 463 includes data from each of the two data centers.

Computers 410 and 420 are examples of computer 110. Computers 410 and 420 may be two separate processing devices in different geographic locations, two servers in the same rack, or two processors within the same hardware device. Virtual machines 414, 415, and 424 are examples of virtual machine 114. Virtual machine 414 includes VSA 416 and virtual machine 415 includes VSA 418. Virtual machine 424 includes VSA 426. VSAs 416, 418, and 426 are examples of VSA 116.

VSA 416 provides access to shared namespace 461 of data center 432 based on a policy. VSA 416 also replicates shared namespace 462 which is a subset of shared namespace 461. VSA 418 operates in a similar manner but performs these functions with respect to shared namespaces 463 and 464. Both namespaces 463 and 464 span the two data centers. VSA 416 and 418 operate independently of each other in computer 410, but each provides access to its respective associated namespace through it associated virtual machine. The number of VSAs implemented in computer 410 may be scaled as needs change. In one example, multiple users may make use of computer 410 and one of VSA 416 and 418 may be dedicated to each user. In another example, VSA 416 and 418 may each support different applications or operations performed using computer 410. In this way, the needs at a particular computer, site, or location can be scaled by adding or removing VSAs while leaving some VSAs unchanged.

VSA 416 and VSA 418 are illustrated as providing access to namespaces which do not overlap. However, VSA 416 and 418 may also be configured to provide access to the same namespace or to namespaces which overlap partially. In other examples, VSA 416 and VSA 418 may be operated as a VSA cluster. Clustered VSAs may provide redundant access to a namespace, provide failover or failback capabilities, and/or provide other recovery capabilities associated with a failed VSA.

In an alternative implementation of FIG. 4, computer 410 may include multiple virtual machines and one or more VSAs may be implemented in each virtual machine.

VSA 426 of virtual machine 424 provides access to namespace 465 and replicates data of namespace 466 in a manner similar to that described with respect to FIG. 3. As illustrated, namespace 465 and 466 may overlap other namespaces which are accessible through other VSAs. For example, a dataset of namespace 466 which is replicated in VSA 426 may be accessed locally at computer 420 while the same dataset, which is also included in namespace 463, is being accessed through VSA 418.

Figure 5:
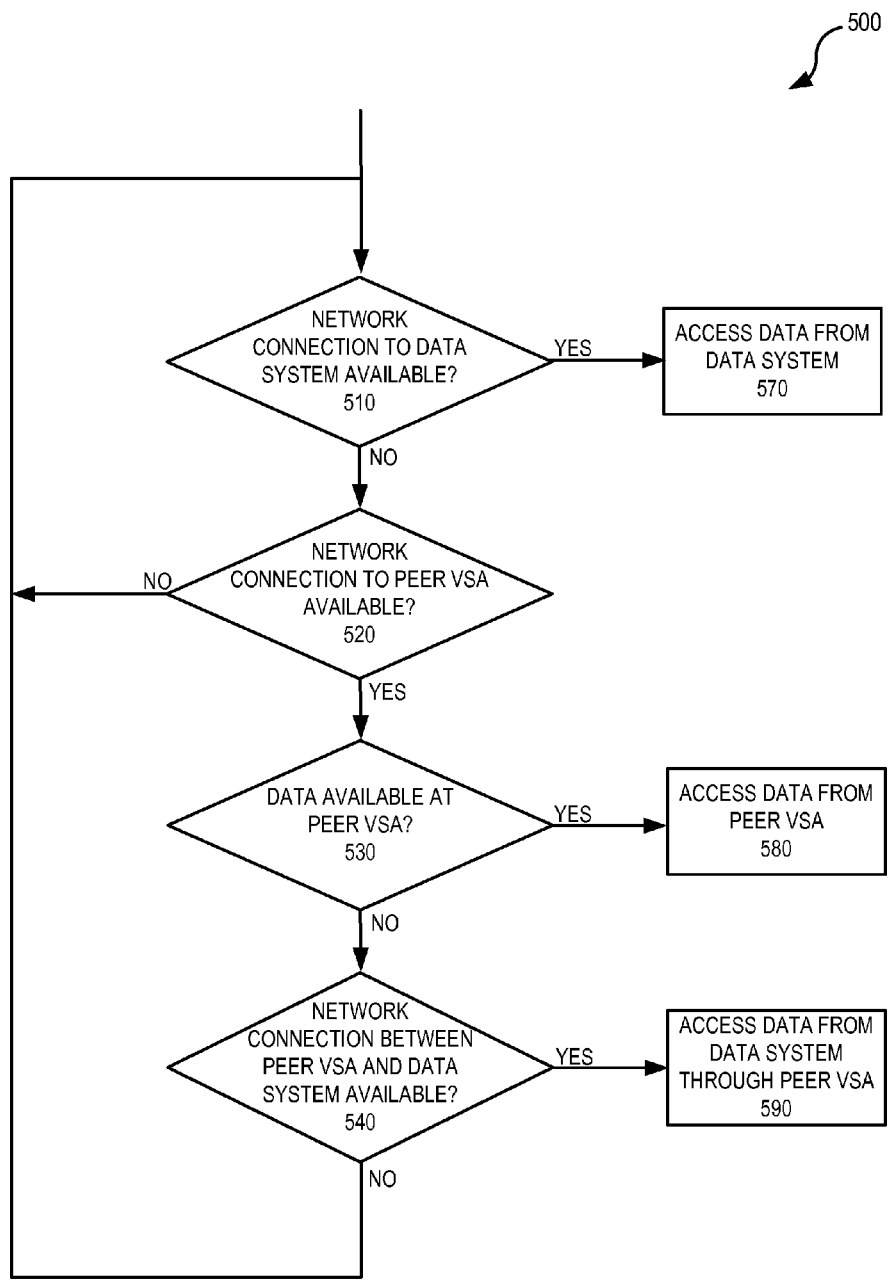
FIG. 5 illustrates an example of a method of operating a storage system with multiple VSAs.

FIG. 5 illustrates method 500 for operating a storage system including multiple VSAs. FIG. 5 is described with respect to VSA 418 of FIG. 4. However, other implementations of method 500 are possible. In this example, there is a need at computer 410 to access a dataset in namespace 463. The needed dataset is not available in the datasets of namespace 464 which have been replicated at VSA 418.

At step 510, VSA 418 determines if a network connection is available between computer 410 and data system 430 through network 492. If a network connection is available, the dataset is accessed from data system 430 over network 492 as described in previous examples (step 570). If a network connection to data system 430 is not available, a determination is made as to whether a network connection to peer VSA 426 is available over network 496 (step 520). If this connection is available, a determination is then made whether the needed dataset is available at peer VSA 426 (step 530). If the dataset is available at VSA 426, the dataset is accessed by VSA 418 from VSA 426 (step 580). If the dataset is not available at VSA 426, a determination is made as to whether a network connection is available between computer 420 and data system 430 over network 494. If a network connection is available, the dataset is accessed by VSA 418 from data system 430 through VSA 426, network 496, and network 494.

In the example above, VSA 426 may be configured to check the policy for permissions associated with the requested dataset to determine if VSA 418 has permission to access the requested dataset. In some cases, VSA 418 may be requesting a dataset which VSA 426 is not permitted to access according to the policy. In this case, VSA 426 may assist in setting up a secure connection or tunnel between VSA 418 and data system 430 even though a user of computer 420 may not be permitted to access the dataset.

In a variation of the example above, VSA 416 or VSA 418 may access data from a peer VSA, such as VSA 426, even though network 492 is available. This may be beneficial if network 492 and/or data system 430 are overloaded or underperforming for some other reason. One or more of VSAs 416, 418, and 426 may be operated as federated elements of data system 430 such that they logically become elements of data system 430.

FIG. 6 is a block diagram of a system 600 that can be used to implement components of a storage system. For example, the system of FIG. 6 can be used to implement a client system, a computer, a network device, or a storage server. In an illustrative embodiment, system 600 includes one or more processor(s) 610, memory 620, a network adapter 640, and a storage adapter 650, all interconnected by an interconnect 660.

Memory 620 includes storage locations that are addressable by processor(s) 610 and adapters 640 and 650 for storing software program code and data structures associated with the techniques introduced here. Processor(s) 610 and adapters 640 and 650 may, in turn, include processing elements and/or logic circuitry configured to execute the software code and manipulate the data structures. It will be apparent to those skilled in the art that other processing and memory implementations, including various machine-readable storage media, may be used for storing and executing program instructions pertaining to the techniques introduced here.

Network adapter 640 includes a plurality of ports to couple system 600 with one or more other systems over point-to-point links, wide area networks, virtual private networks implemented over a public network, or a shared local area network. Network adapter 640 can include the mechanical components and electrical circuitry needed to connect system 600 to a network such as network 190. One or more systems can communicate with other systems over network 190 by exchanging packets or frames of data according to pre-defined protocols, such as TCP/IP.

Storage adapter 650 interfaces with an operating system running on processor(s) 610 to access information on attached storage devices. The information may be stored on any type of attached array of writable storage media, such as hard disk drive (HDD), magnetic tape, optical disk, flash memory, solid-state drive (SSD), random access memory (RAM), MEMs memory and/or any other similar media adapted to store information. Storage adapter 650 includes a plurality of ports having input/output (I/O) interface circuitry that couples with the disks over an I/O interconnect arrangement.

Embodiments of the present invention include various steps and operations, which have been described above. A variety of these steps and operations may be performed by hardware components or may be embodied in machine-executable instructions, which may be used to cause one or more general-purpose or special-purpose processors programmed with the instructions to perform the steps. Alternatively, the steps may be performed by a combination of hardware, software, and/or firmware.

Embodiments of the present invention may be provided as a computer program product which may include a machine-readable medium having stored thereon non-transitory instructions which may be used to program a computer or other electronic device to perform some or all of the operations described herein. The machine-readable medium may include, but is not limited to optical disks, compact disc read-only memories (CD-ROMs), magneto-optical disks, floppy disks, ROMs, random access memories (RAMs), erasable programmable read-only memories (EPROMs), electrically erasable programmable read-only memories (EEPROMs), magnetic or optical cards, flash memory, or other type of machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link.

The phrases "in some embodiments," "according to some embodiments," "in the embodiments shown," "in other embodiments," "in some examples," and the like generally mean the particular feature, structure, or characteristic following the phrase is included in at least one embodiment of the present invention, and may be included in more than one embodiment of the present invention. In addition, such phrases do not necessarily refer to the same embodiments or different embodiments.

While detailed descriptions of one or more embodiments of the invention have been given above, various alternatives, modifications, and equivalents will be apparent to those skilled in the art without varying from the spirit of the invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof. Therefore, the above description should not be taken as limiting the scope of the invention, which is defined by the claims.

What is claimed is:

1. A storage system, comprising:
   a storage server system including a first shared namespace of data; and
   a virtual storage appliance (VSA) implemented in a virtual machine running on a computing device remote to the storage server system, the computing device operatively connected to the storage server system over a network connection, to:
      provide access to a second shared namespace of data over the network connection, wherein the second shared namespace is defined by a policy and includes a shared subset of the first shared namespace; and
      replicate data of a third shared namespace of data at the VSA running on the computing device remote to the storage server system to make the replicated data of the third shared namespace available at the VSA when the network connection is unavailable, wherein the third shared namespace is defined by the policy and includes a subset of the second shared namespace;
   wherein the virtual machine isolates operations of the virtual storage appliance from other processing activities on the computing device and implements the virtual storage appliance in an operating system that is different from an operating system of the computing device.

2. The storage system of claim 1 wherein the VSA is configured to:
   permit a modification of a dataset in the third shared namespace at the VSA when the network connection is unavailable; and
   synchronize the modification with the first shared namespace based on the policy when the network connection is available.

3. The storage system of claim 1 wherein the VSA is configured to:
   permit creation of a new dataset in the third shared namespace at the VSA when the network connection is unavailable; and
   adding the new dataset to the first shared namespace when the network connection is available.

4. The storage system of claim 1 further comprising:
   a peer VSA implemented in the virtual machine, operatively connected to the storage server system over the network connection, to:
      provide access to a fourth shared namespace of data over the network connection, wherein the fourth shared namespace is defined by the policy and includes a subset of the first shared namespace; and
      replicate data of a fifth namespace of data at the peer VSA making the data of the fifth namespace available at the peer VSA when the network connection is unavailable, wherein the fifth namespace is a subset of the fourth shared namespace.

5. The storage system of claim 4 wherein the VSA and the peer VSA comprise a VSA cluster.

6. The storage system of claim 1 wherein the storage server system comprises a plurality of data storage devices operated and the VSA as a federated group, and wherein modifications of or additions to the third shared namespace of data at the VSA are synchronized within the federated croup when the network connection is available.

7. The storage system of claim 1 wherein the virtual machine is implemented in an end user computing device.

8. A method of operating a storage system, comprising:
   establishing a network connection between a virtual storage appliance (VSA) in a virtual machine and a storage server system, wherein the virtual machine runs on a computing device remote to the storage server system;
   providing access to a second shared namespace of data at the VSA over the network connection, wherein the second shared namespace is a policy defined subset of a first shared namespace of the storage server system; and
   replicating data of a third shared namespace of data at the VSA running on the computing device remote to the storage server system to make the data of the third shared namespace available at the VSA when the network connection is unavailable, wherein the third shared namespace is a policy defined subset of the second shared namespace;
   wherein the virtual machine isolates operations of the virtual storage appliance from other processing activities on the computing device and implements the virtual storage appliance in an operating system that is different from an operating system of the computing device.

9. The method of claim 8 further comprising:
   permitting a modification of a dataset in the third shared namespace at the VSA when the network connection is unavailable; and
   synchronizing the modification with the first shared namespace when the network connection is available.

10. The method of claim 8 further comprising:
    permitting creation of a new dataset in the third shared namespace at the VSA when the network connection is unavailable; and
    adding the new dataset to the first shared namespace when the network connection is available.

11. The method of claim 8 further comprising:
    providing access to a fourth shared namespace of data over the network connection at a peer VSA, wherein the fourth shared namespace is a policy defined subset of the first shared namespace; and
    replicating data of a fifth shared namespace of data at the peer VSA making the data of the fifth shared namespace available at the peer VSA when the network connection is unavailable, wherein the fifth shared namespace is a policy defined subset of the fourth shared namespace.

12. The method of claim 11 wherein the peer VSA is implemented in the virtual machine.

13. The method of claim 11 wherein the peer VSA is implemented in another virtual machine.

14. The method of claim 11 further comprising accessing the replicated data of the fifth namespace through the VSA.

15. The method of claim 8 wherein the storage server system comprises a plurality of data storage devices operated as a federated group.

16. The method of claim 15 wherein the VSA is included in the federated group.

17. The method of claim 8 wherein the virtual machine is implemented in a portable end user computing device.

18. A non-transitory machine-readable storage medium storing instructions, that, when executed by one or more processors, direct the one or more processors to:
    establish a network connection between a virtual storage appliance (VSA) in a virtual machine and a storage server system, wherein the virtual machine runs on a computing device remote to the storage server system;
    provide access to a second shared namespace of data at the VSA, wherein the second shared namespace is a policy defined subset of a first shared namespace of the storage server system;

replicate data of a third shared namespace of data at the VSA running on the computing device remote to the storage server system making the data of the third shared namespace available at the VSA when the network connection is unavailable, wherein the third shared namespace is a policy defined subset of the second shared namespace;

permit a modification of a dataset in the third shared namespace at the VSA when the network connection is unavailable; and synchronize the modification with the first shared namespace when the network connection is available;

wherein the virtual machine isolates operations of the virtual storage appliance from other processing activities on the computing device and implements the virtual storage appliance in an operating system that is different from an operating system of the computing device.

19. The non-transitory machine-readable storage medium of claim 18 wherein the instructions further direct the one or more processors to:

permit creation of a new dataset in the third shared namespace at the VSA when the network connection is unavailable; and add the new dataset to the first shared namespace when the network connection is available.

20. The non-transitory machine-readable storage medium of claim 18 wherein the instructions further direct the one or more processors to provide access to a fourth shared namespace of data over the network connection at a peer VSA, wherein the fourth shared namespace is a policy defined subset of the first shared namespace; and replicate data of a fifth shared namespace of data at the peer VSA making the data of the fifth shared namespace available at the peer VSA when the network connection is unavailable, wherein the fifth shared namespace is a policy defined subset of the fourth shared namespace.

21. The non-transitory machine-readable storage medium of claim 20 wherein the peer VSA is implemented in the virtual machine.

22. The non-transitory machine-readable storage medium of claim 20 wherein the peer VSA is implemented in another virtual machine.

23. The non-transitory machine-readable storage medium of claim 20 wherein the instructions further direct the one or more processors to provide the VSA access to the replicated data of the fifth namespace at the peer VSA.

24. The non-transitory machine-readable storage medium of claim 18 wherein the storage server system comprises a plurality of data storage devices operated as a federated group.

25. The non-transitory machine-readable storage medium of claim 24 wherein the VSA is included in the federated group.

26. A processing device comprising a virtual machine that includes a virtual storage appliance (VSA) running on a computing device remote to a storage server system, the computing device operatively connected to the storage server system over a network connection, to:

provide access to a second shared namespace of data over the network connection, wherein the second shared namespace is a subset of a first shared namespace of data in the storage server system;

replicate data of a third shared namespace of data at the VSA running on the computing device remote to the storage server system, wherein the third shared namespace is a subset of the second shared namespace;

permit a modification of an existing dataset in the third shared namespace at the VSA when the network connection is unavailable;

synchronize the modification with the first shared namespace when the network connection is available;

permit creation of a new dataset in the third shared namespace at the VSA when the network connection is unavailable; and add the new dataset to the first shared namespace when the network connection is available;

wherein the virtual machine isolates operations of the virtual storage appliance from other processing activities on the computing device and implements the virtual storage appliance in an operating system that is different from an operating system of the computing device.

27. The processing device of claim 26 wherein the virtual machine includes additional VSAs configured to operate with the VSA as a cluster.

28. The processing device of claim 26 wherein the VSA and the storage server system comprise a federated group.

* * * * *